(12) United States Patent
Nossik et al.

(10) Patent No.: US 10,520,580 B2
(45) Date of Patent: Dec. 31, 2019

(54) METHOD AND SYSTEM OF DETERMINING AN ESTIMATED POSITION OF A TARGET ELECTRONICALLY TAGGED OBJECT

(71) Applicant: Haystack Magic Inc., Ottawa, Ontario (CA)

(72) Inventors: Misha Nossik, Ottawa (CA); Dmitry Sotnikov, Rishon LeTsiyon (IL); Alex Efros, Rishon LeTsiyon (IL); Vadim Gouterman, North York (CA); Neil Teitelbaum, Ottawa (CA)

(73) Assignee: Haystack Magic Inc., Ottawa, Ontario (CA)

(*) Notice: Subject to any disclaimer, the term of this patent is extended or adjusted under 35 U.S.C. 154(b) by 4 days.

(21) Appl. No.: 15/958,836

(22) Filed: Apr. 20, 2018

(65) Prior Publication Data

US 2018/0306895 A1    Oct. 25, 2018

Related U.S. Application Data

(60) Provisional application No. 62/619,189, filed on Jan. 19, 2018, provisional application No. 62/489,534, filed on Apr. 25, 2017.

(51) Int. Cl.
*H04Q 5/22*    (2006.01)
*G01S 5/02*    (2010.01)
*G01S 19/51*    (2010.01)

(52) U.S. Cl.
CPC ............ *G01S 5/0284* (2013.01); *G01S 5/021* (2013.01); *G01S 5/0221* (2013.01); *G01S 5/0231* (2013.01); *G01S 5/0294* (2013.01); *G01S 19/51* (2013.01)

(58) Field of Classification Search
USPC ...................................... 340/539.13
See application file for complete search history.

(56) References Cited

U.S. PATENT DOCUMENTS

| | | | |
|---|---|---|---|
| 8,094,012 B1* | 1/2012 | Tran ........................ | G01S 11/16 340/539.13 |
| 2005/0068168 A1* | 3/2005 | Aupperle ........... | G08B 13/1427 340/539.13 |
| 2006/0250219 A1* | 11/2006 | Hui ........................ | G06Q 10/08 340/10.1 |
| 2009/0102612 A1* | 4/2009 | Dalbow ................ | A61N 5/1048 340/10.4 |
| 2010/0289646 A1* | 11/2010 | Raniere ................... | G08B 13/14 340/572.1 |
| 2019/0180588 A1* | 6/2019 | Lerner ................ | G08B 13/2462 |

\* cited by examiner

*Primary Examiner* — Brent Swarthout
(74) *Attorney, Agent, or Firm* — Teitelbaum Bouevitch & McLachlen; Neil Teitelbaum

(57) ABSTRACT

A method and system for determining a position of tagged objects by their proximity to each other, where the position of a target object is provided as common names of other objects nearby. This allows new ways of tracking objects that are required to be together with each other, or to be within a certain area, while reducing the power consumption of electronic tags and tag readers.

13 Claims, 7 Drawing Sheets

METHOD AND SYSTEM OF DETERMINING AN ESTIMATED POSITION OF A TARGET ELECTRONICALLY TAGGED OBJECT

CROSS REFERENCE PARAGRAPH

The present invention claims priority from U.S. Provisional Application No. 62/489,534 filed Apr. 25, 2017 and U.S. Provisional Application No. 62/619,189 filed Jan. 19, 2018, which are incorporated herein by reference.

FIELD OF THE INVENTION

This invention relates generally to tracking of tagged objects using low energy RF beacons.

BACKGROUND

Numerous systems of locating objects are known using similar devices, however many of these systems provide locations of objects in terms of coordinates on a map. An example would be a latitude and longitude received from a GPS satellite constellation, or an offset from a reference position. In addition, many existing systems provide a real-time location of an object, processing the available information on request, without taking into account any historical information collected in the past.

It is an object of this invention to provide a position of a target object by providing the common names of one or more other objects located in spatial proximity of the target object. This may be derived from a series of observations over a relatively long period of time.

It is a further object of this invention to use electronic tags such as low energy RF beacons to determine relative positions of electronically tagged objects, and to determine if the objects that are in close proximity to each other are moving together, and to detect if one or more objects in a set of objects is missing. Beacons of this type are commercially available from vendors such as Estimote, Kontakt, Gimbal, Minew and many others.

It is a further object of this invention to use the information about electronically tagged objects' locations and positions relative to each other to control the power consumption of the system.

SUMMARY OF THE INVENTION

In accordance with an aspect of the invention there is provided, a system for providing an indication of an object's location, comprising: a database and an associated processor and software application for providing plural sets of electronically tagged objects wherein each electronically tagged object has an identity stored in the database that corresponds to the object's common name, and wherein objects in each set represent physical objects in close spatial proximity to each other, and wherein the spatial proximity is less than 20 feet and wherein electronically tagged objects in different sets are a distance greater than 20 feet from each other; and, a query system having access to the database and for delivering an indication of the object's location.

In accordance with another aspect there is provided, in a system where tagged objects have a tag descriptor and a common understood name unrelated to location thereof, a method of providing the relative location of an electronically tagged target object comprising: receiving a query for the location of the tagged target object or the identity of an electronic tagged object in proximity to the tagged target object; determining from a database of a plurality of tagged objects one or more tagged objects that is in proximity to the target tagged object and returning the common understood name of the one or more tagged objects in proximity to the target tagged object.

DETAILED DESCRIPTION

Figure 1:
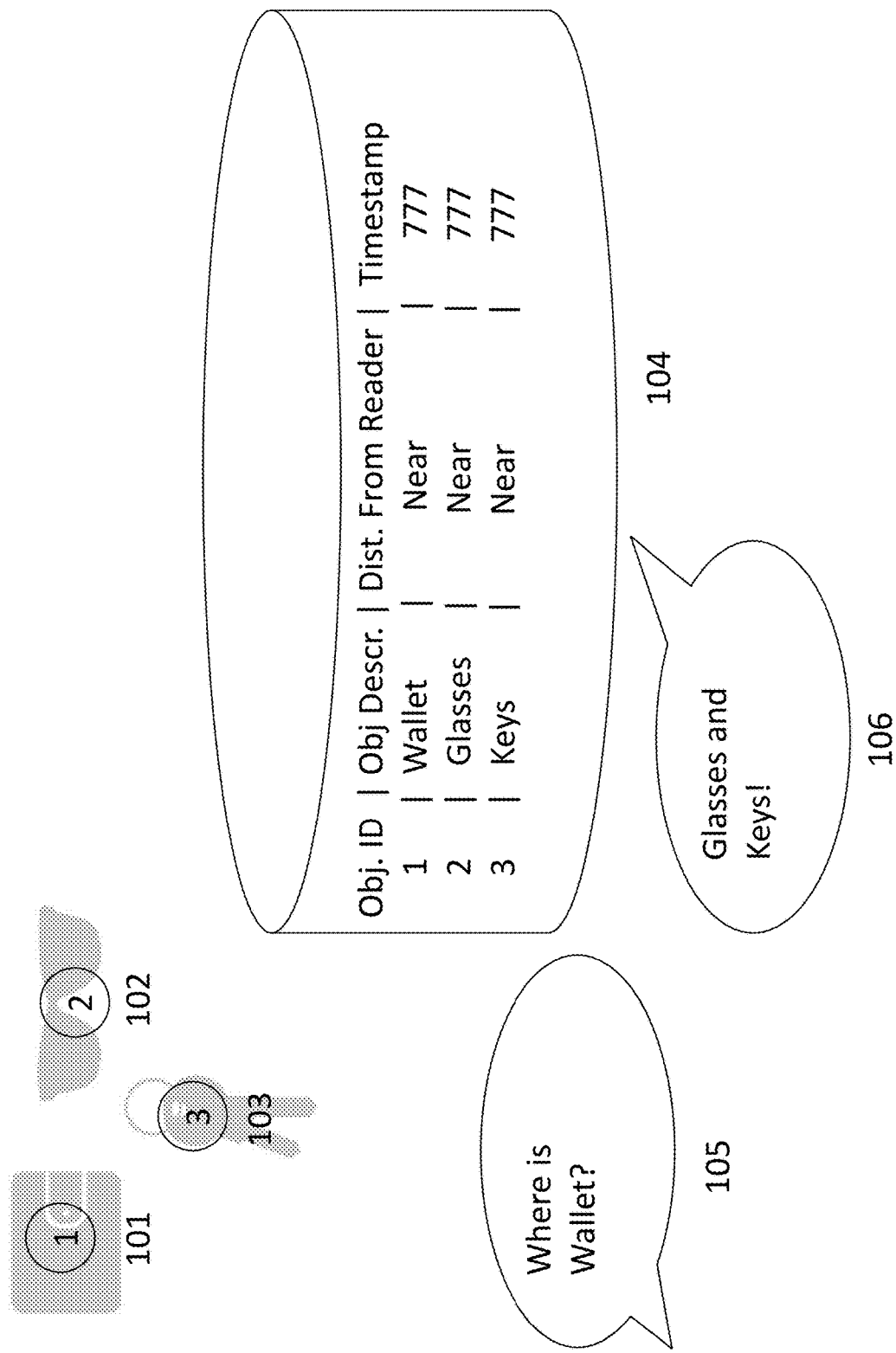
FIG. 1 is a diagram of a database for discovery of relative location of objects and tags in accordance with this invention.

Using coordinates to describe a position of an object in a system of coordinates is appropriate when providing such position to a computer. Notwithstanding, to a human, the coordinates are not very useful by themselves, without a reference to something that human senses can perceive.

Today, most systems for location of objects use real-time references that humans can process. These typically rely on a person's vision or hearing. For example, a map provides a visual representation. If one can see a landscape or interior feature, one can compare it with the map and find a point corresponding to coordinates. Other systems for locating an object use sound, by causing a sound to be emitted from a point in space corresponding to a sought coordinate that a human hearing sense can use to locate the point.

However, such systems have limitations and dependencies on existence of maps, on the physiological ability and the physical proximity to be able to see or hear, as the case may be.

This invention overcomes these limitations. When a user queries the system for the location of a particular object, for example, a wallet, the method and system described in more detail hereafter provide an answer in the form of the common names of objects that have been observed by the system and calculated using the methods of this invention to be in close proximity to the target object, providing the user with a context in which the object resides. For example, the answer may be: "The wallet is next to the keys and not far from glasses". The person uses the context to determine a location of the target object using the knowledge about locations of other objects that are included in the context with the target object. So, in essence, when request for a location of an object is received by the system, it gives a reply in the form of a commonly understood name of one or more objects nearby. In particular instances, for example where the wallet is next to the piano, it is very easy for the person to locate the wallet as the piano is typically a permanently fixed object whose location is clearly known.

Giving a context of an object in the form of the names of surrounding objects has the following advantages:

There is no need to rely on the availability and accuracy of a map. An object may be located without being able to see or hear it. The user can rely solely on the textual description of the location without the need to see or interpret any graphics.

Some of these advantages enable efficient location of objects when visual observation is not possible, for example for a visually impaired person, in the dark or in poor visibility. In many situations, a visually impaired person relies exclusively on remembering the locations of various objects by reference to other objects. When an object is not in its expected location, the only way to describe its changed location to a visually impaired person is to describe other objects that are nearby.

The context of an object is particularly well suited for use with voice assistant devices such as Google Home or Amazon Echo, and their respective services Google Assistant and Amazon Alexa. These devices and services can be integrated with an item location service based on the invention described herein by using Google and Amazon published integration tools, to achieve the following functionality: a question about a target object location asked by user using voice interface will be answered by a voice assistant in the form of the target object context.

In a preferred embodiment the user starts with issuing a so-called 'wake sentence" to signal to the voice assistant service that an object location service is going to be used. This sentence may be "Haystack Magic", for example. The voice assistant responds with a prompt, for example "What are you looking for?". The user responds with a keyword, identifying the object the user wants to be located, for example "Sunglasses". The voice assistant sends the target object name to the object location service. The object location service returns the context of the target object in the form of the common names of one or more other objects located in spatial proximity of the target object, in the ascending order of proximity, such as "Sunglasses are near the wallet and not far from the keys".

The context of an object can be established by creating an abstract notion of a set, where all objects that are members of a set are within a certain distance from each other. A set may be represented in a form of a graph, where nodes are the objects, and edges are the distances between the objects. A set is defined as all objects within a certain distance from each other. It is represented as a fully connected graph, where each node is connected to all other nodes by edges that are less then certain distance.

Alternatively, a set may be defined as a group of objects, where any object has at least one other object within a certain distance from it. It is represented as a connected graph where all edges are less than a certain distance.

Yet another way to define a set is as a group of objects any object has at least one other object within a certain first distance from it, and no two objects are farther from each other than a certain second distance, where first distance is less than a second distance. It is represented as a connected graph, where all edges are less than a certain distance, and no path is longer than a certain number of edges.

Sets may be determined by attaching electronic tags such as RF beacons to objects and measuring the received signal strength indication (RSSI) between a remote reader in the form of client computer such as mobile phone, and the electronically tagged objects. Assuming the remote readers are mobile and the majority of objects are relatively static, as is the case with mobile phones and household belongings or workplace tools, the remote readers will collect thousands to millions of readings over time. These readings will contain unique identifiers of objects based on their attached electronic tag identity and estimates of proximity to the remote reader. The proximity can be expressed in terms of Near, Far or Away. Near may be a distance estimated to be less than a certain value, for example 20 feet. Far may be a distance estimated to be greater than a certain value, for example 50 feet. Away is the lack of reading. The algorithm, in a preferred embodiment implemented in software running on a server, processes the readings collected in the database over a period of time, from a few seconds to a few hours or days, determines the distances between the objects. For example, if two objects were observed within a close proximity from a remote reader or multiple remote readers simultaneously and repeatedly over a period of time, they are likely within close proximity to each other. If one object was in close proximity to a remote reader or multiple remote readers, and another object was not in close proximity to the same remote readers simultaneously and repeatedly over a period of time, then the two objects are likely not in close proximity to each other.

Repeating the processing described above for multiple objects, sets may be formed from objects that satisfy one of above examples of set definitions. Once the sets are formed, they may be used for prevention of loss with automatic set completeness alerts, geofencing and system power consumption management.

A useful property of sets lies in the ability to track their completeness and promptly determine when one or more objects are not present in a set. If after the set is formed, one or more objects from the set are discovered not to be part of the set any longer, an automatic alert can be issued under pre-determined conditions. Such conditions, for example, may be the movement of the incomplete set, as determined by the remote reader. The remote reader such as mobile phone can detects its movement using one of or the combination of accelerometer, GPS, in-door sensor-based navigation system and other means. If some members of the set are not moving with the phone, the set-forming algorithm will discover that and the alert will be generated to warn the user that some objects may have been forgotten or misplaced. They can be located by the method described above, with the use of a list of names of objects that are in close vicinity of the forgotten or misplaced object.

Sets may be used to check whether objects remain within a defined perimeter, and to issue automatic alerts when objects leave the perimeter. It is otherwise known as geo-fencing. To implement geo-fencing, a sufficient number of fixed locations such as points on the walls, furniture, doors and windows may be electronically tagged to be included in sets, such that each movable electronically tagged object shall always be in a set with at least one fixed location. If an object is not present in any set with a fixed location, then an alert shall be issued to indicate that the object may have been removed from the premises.

Sets may also be used to manage power consumption by RF tags such as Bluetooth Low Energy (BLE) beacons and remote readers such as mobile phones. If one of the electronically tagged objects has a permanent fixed location, its geographic coordinates such as provided by GPS can be determined and saved in a database when a mobile remote reader such as a phone with GPS receiver is determined to be in close proximity such as 20 feet to the object. Now, when in the vicinity of such object or any other objects that are included in the set with the fixed object, the phone's approximate position is known to be within a certain distance from the fixed object with known geographic coordinates. Therefore, the phone GPS receiver can be turned off at that time to conserve the phone battery consumption.

Furthermore, two or more remote readers such as mobile phones can be determined to be in close proximity to each other by a server algorithm, that discovers that the readers are in close proximity to the same object or objects belonging to the same set. The server can send a command to some or all readers to reduce their rate of scanning for signals from the electronically tagged objects to reduce the reader's power consumption.

Furthermore, when an electronically tagged object geographic coordinates are known, all remote readers that are in close proximity to the said object as determined by the signal received from the electronic tag attached to the said object, are given a command by the server to turn off their GPS function in order to reduce the readers' energy consumption, and to use the known geographic location of the said object instead of the GPS position.

Finally, when objects have been observed being in the same set for a period of time, for example greater than 5 minutes the system can issue a command to RF tags attached to objects included in the set to increase the broadcast period of its signal, or to reduce its transmit power, or both, to conserve their energy consumption.

Referring now to FIG. 1 a method and system of this invention may be understood of providing a response to the query about an object's location in the form of the names of objects that have been observed by the system and calculated using the methods of this invention to be in close proximity of the target object. The information about electronically tagged objects with common names or commonly understood names wallet 101, glasses 102 and keys 103 are stored in the database 104. All three objects were observed by remote readers such as mobile phones at approximately the same time 777 and were determined to be in close proximity with each other. Database 104 includes a query system allowing users to send queries to the database and receive responses from it. Therefore, the user query 105 about location of object 101 is answered with a response 106 that contains commonly understood names of objects 102 and 103. If the user remembers location of one or more of the objects in response, the user will know the approximate location of the target object.

Figure 2:
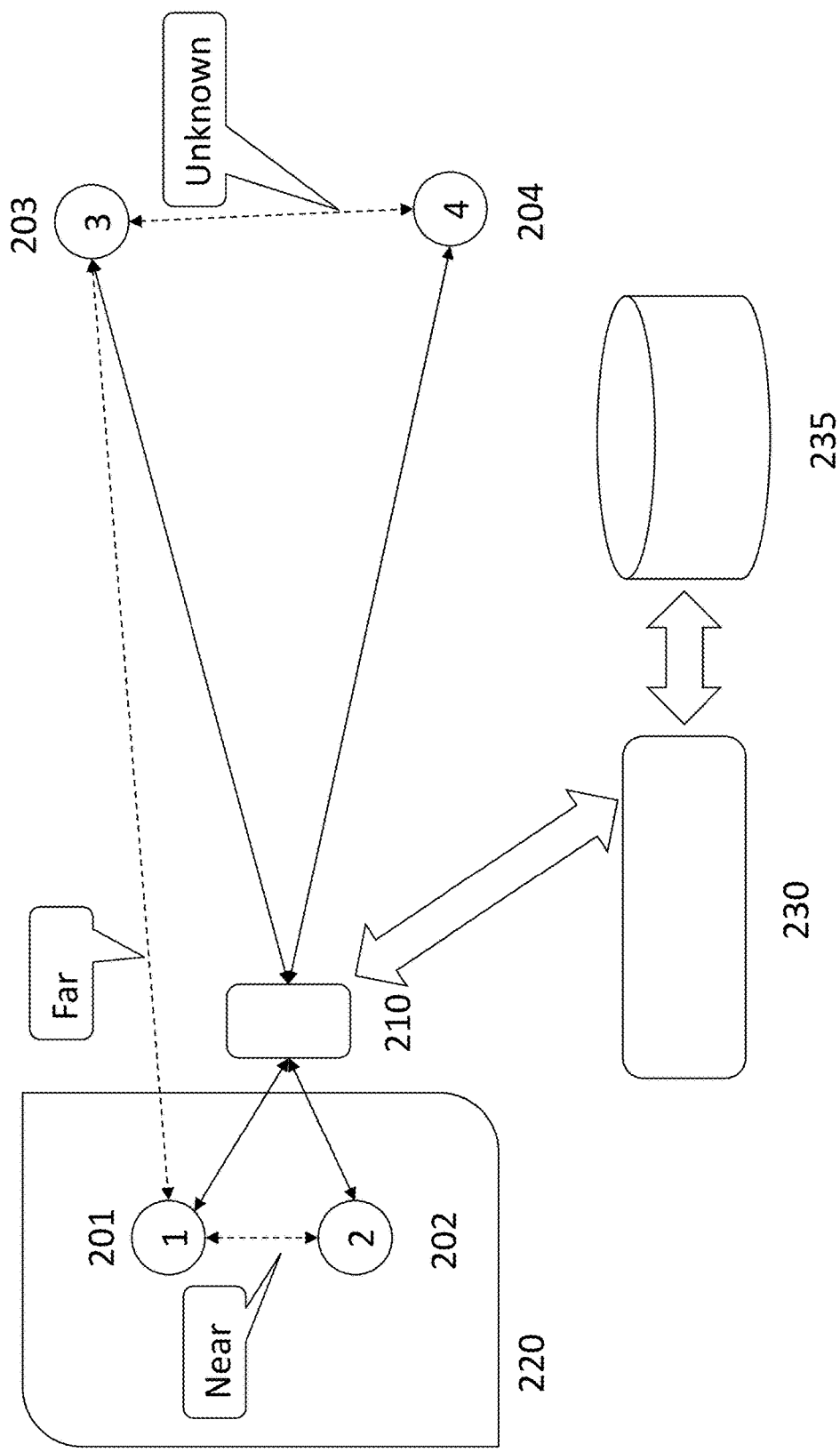
FIG. 2 is a diagram of a system used to determine electronically tagged objects for grouping in sets based on their proximity to each other.

FIG. 2 illustrates the system and method used to determine which electronically tagged objects shall be grouped in sets based on their proximity to each other. One or more remote readers such as mobile phones 210 are used to measure their estimated distances from electronically tagged objects 201, 202, 203 and 204. In preferred embodiment, the estimates are sent to processor implemented and suitably programmed on server 230, along with identities of the objects, timestamps of measurements and other relevant information such as GPS position of the phone, accelerometer readings and the like. The server stores the information in a database 235. In another embodiment the information may be stored in database located on remote reader or distributed between remote readers. Server 230 executes software implementing an algorithm that determines sets of objects by their proximity to each other. For example, if objects 201 and 210 are estimated to be each within 10 ft from the phone 210, they are assumed to be within 20 ft from each other, and therefore will be marked Near, and included in a set 220. Object 203 is observed at estimated distance greater than 50 ft from the phone 210. The algorithm assumes it is far from all members of the set 220. Object 204 is also observed at estimated distance greater than 50 ft from the phone 210. The algorithm cannot make any assumptions about a distance between 203 and 204 based on these observations, and until more data becomes available the distance between 203 and 204 will be marked unknown.

Figure 5:
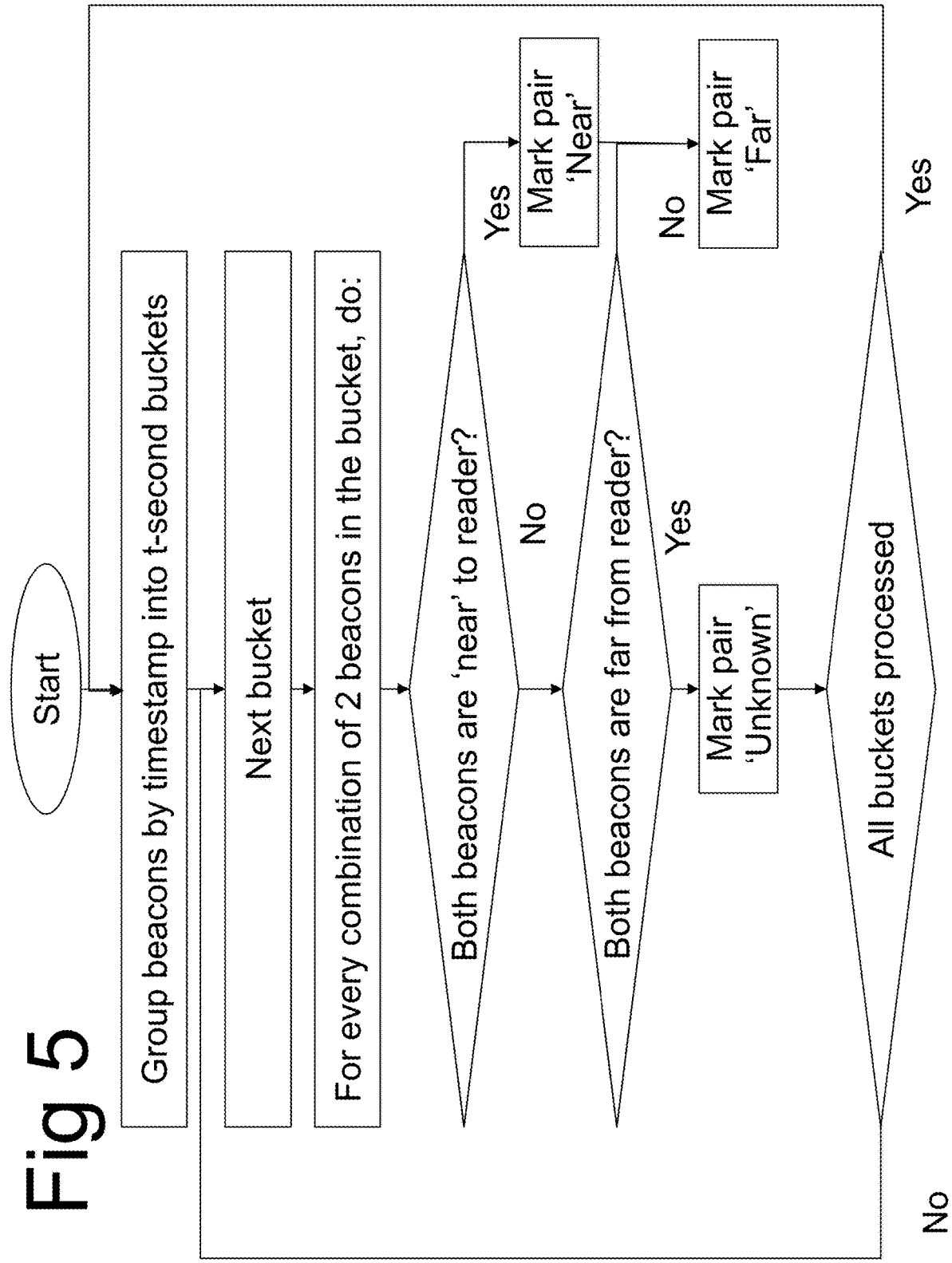
FIG. 5 is a high level flow chart for determining proximity of the beacons to each other.

FIG. 5 is a high level flow chart of an algorithm for determining the spatial proximity of the beacons to each other. As described previously, the database contains data about beacons' proximity to a remote reader, and the timestamp of the data reception by the reader. The algorithm running on a server processor groups the records in the database by temporal proximity to each other. This is done by assigning database records to logical groups that we call buckets, whereas each bucket contains records with timestamps that fall within a specific time T, for example 1 second or 10 seconds, from a timestamp that marks the beginning of a bucket. This can be done by sorting all entries by ascending value of their timestamp, and assigning an entry to bucket n if its timestamp falls within $$\text{(timestamp of entry 1)} + T^*(n-1) \text{ and (timestamp of entry 1)} + T^*n$$

where n runs from 1 to N=(timestamp of last entry−timestamp of entry 1)/T

Then, for every bucket, all pairs of beacons are evaluated, where pairs determined as all combinations of M=number of all the data records in a bucket by N=2. If both beacons in the pair are near the reader, the pair is marked as 'near' to each other. Otherwise, if the both beacons in the pair are far from the reader, the pair is marked as 'unknown' distance from each other. Otherwise, it means that one beacon is near the reader, and the other is far from the reader, and therefore they are marked as 'far' from each other.

Figure 6:
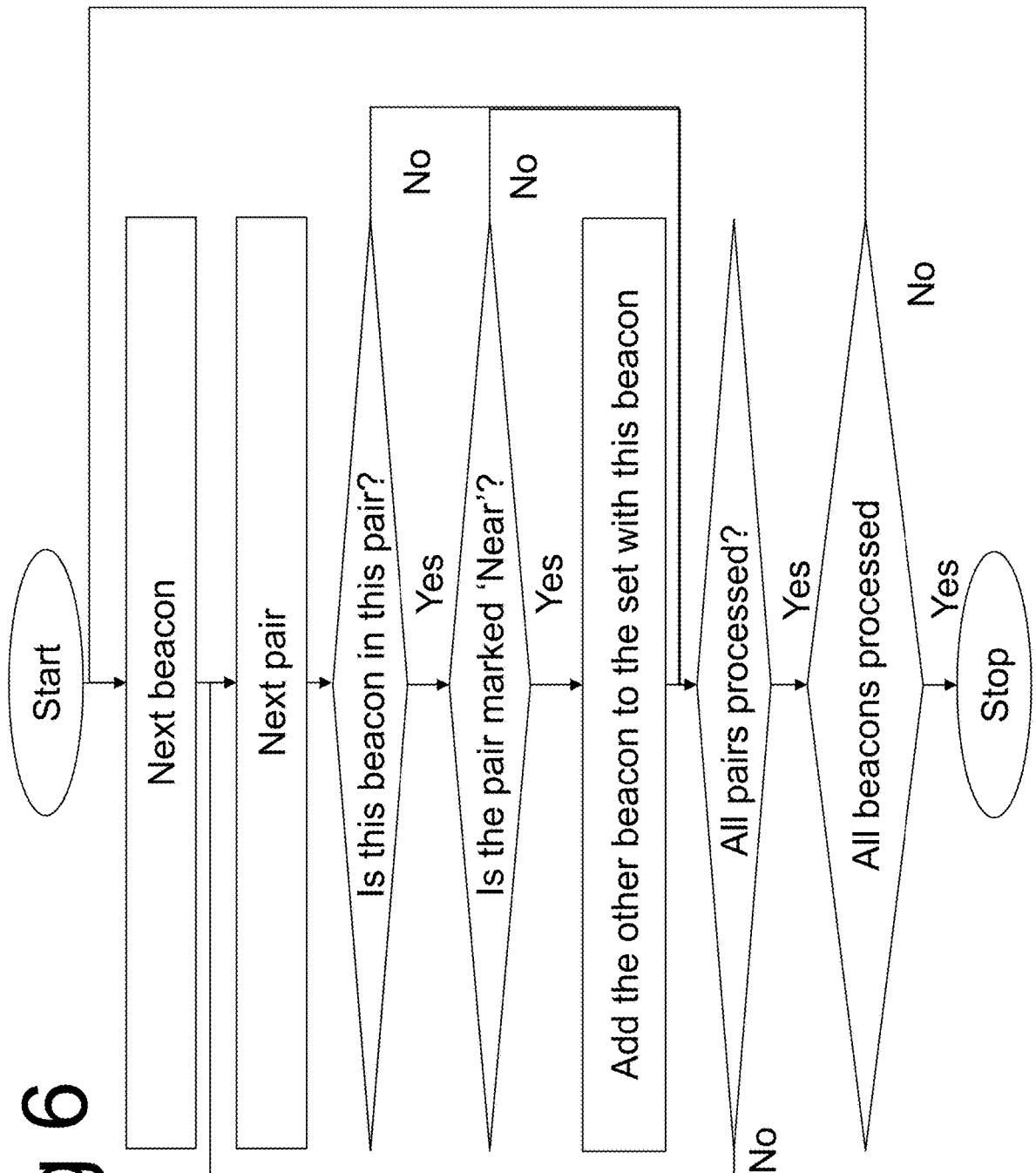
FIG. 6 is a flow chart for determining if a beacon shall be included in a set.
Figure 7:
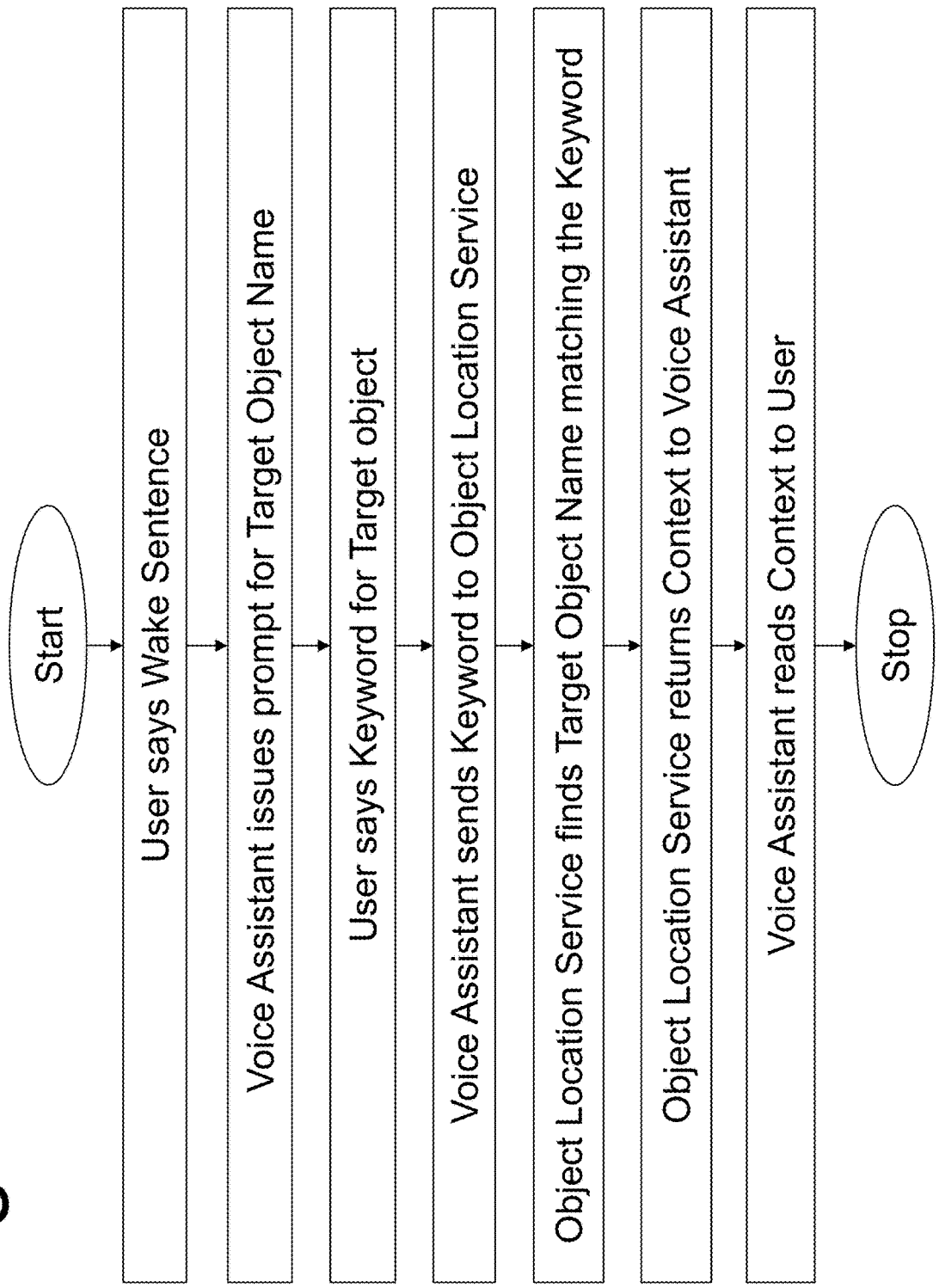
FIG. 7 is a flow chart for integration with voice assistant service

Turning now to FIG. 6 a high level flow chart for determining if a beacon shall be included in a set by proximity to other beacons in the set is shown. For each beacon it evaluates every pair in a bucket marked by the algorithm described above and checks if the beacon is part of a pair. If the pair is marked near, the other beacon in the pair is included in the set of beacons that are in close proximity to the first beacon.

Figure 3:
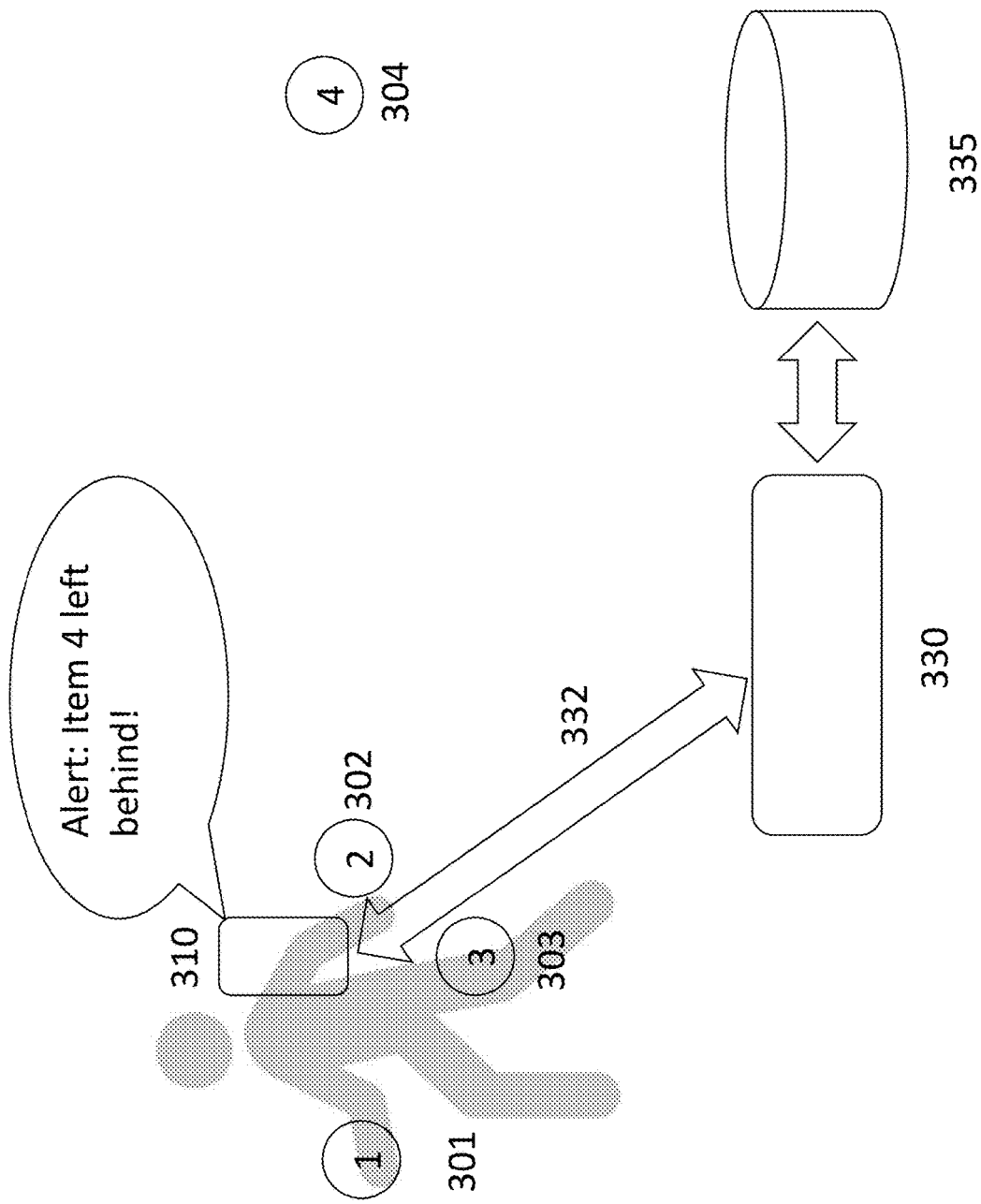
FIG. 3 is an illustration of automatic alerting issued upon discovery of incomplete sets.

FIG. 3 shows automatic alerting issued upon discovery of incomplete sets under certain conditions. Items 301-304 were determined to be in close proximity to each other and labeled as a set. Subsequently, items 301-303 were detected to be in a set while the remote reader mobile phone 310 was detected as moving. Within a short period of time item 304 was determined to be far from the phone 310 and was removed from the set by the algorithm. At this point the command 332 will be issued by server 330 via phone 310 to send an alert to the user about the item 304 that has been left behind.

Figure 4:
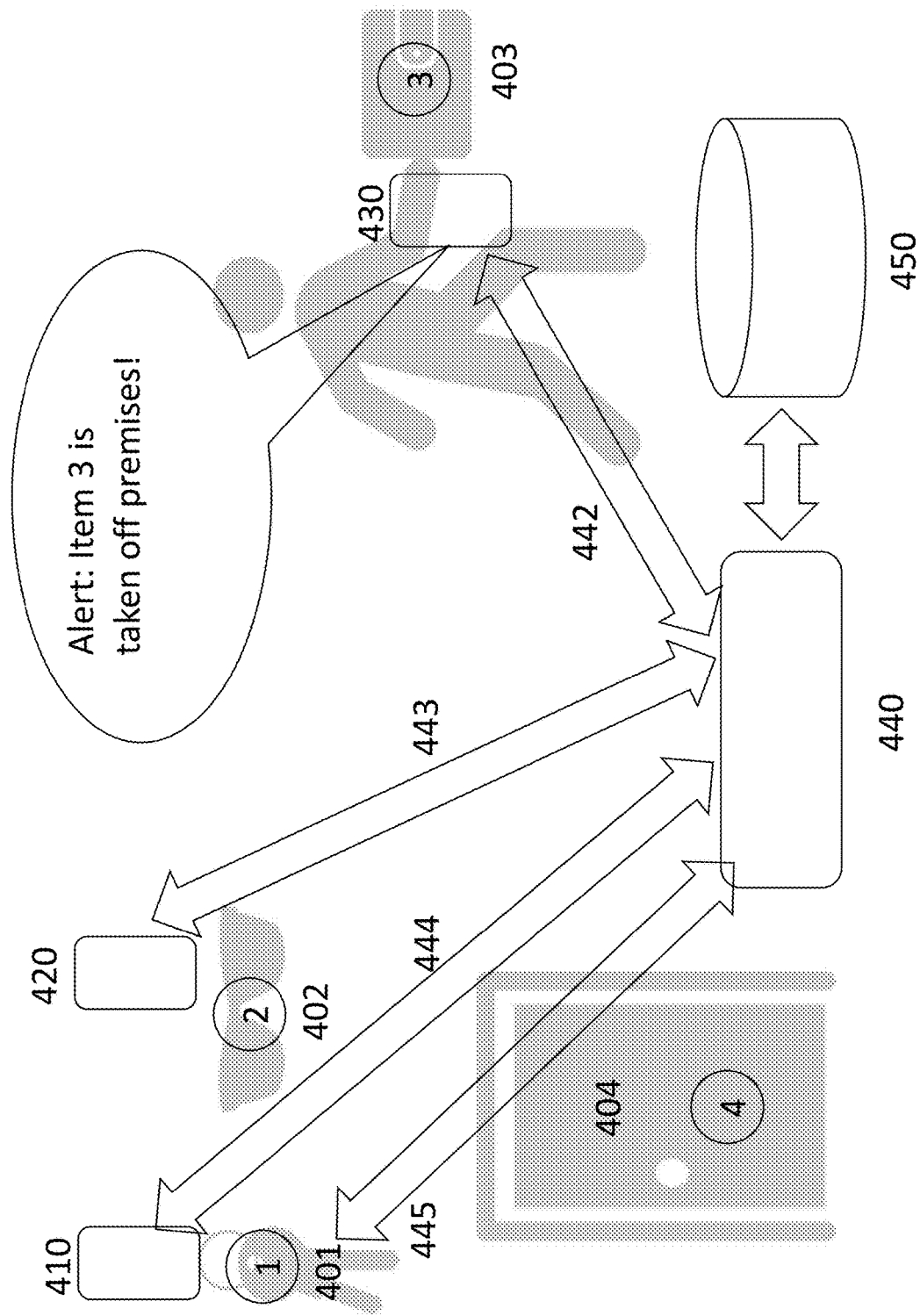
FIG. 4 is an illustration of geofencing—perimeter protection with automatic alerting issued upon removal of protected objects from protected premises and also an illustration of methods to conserve power consumption within the system.

FIG. 4 illustrates the preferred embodiments for geofencing and system power management. Objects 401-404 are determined by server 430 using database 435 to belong to a set by being in close proximity to each other. Subsequently, item 403 was detected to be no longer in a set with objects 401, 402 and 404 from data sent by remote reader 430 to server 440 for analysis together with data stored in database 450. Because the object 403 was not in a set with any of the fixed objects like 404 that determine the perimeter of the premises, the server 440 issues the command 442 to remote reader 430 to send an alert about the item 403 being carried off premises.

Further on FIG. 4, the two remote readers 410 and 420 are determined by server 440 to be in close proximity to the same subset of objects 401 and 402. The server 440 receives the same or substantially similar information from both remote readers 410 and 420. In order to reduce power consumption by remote reader 420, the server sends the command 443 to the remote reader 420 to reduce its rate of scanning for information from objects' electronic tags.

Further on FIG. 4, the readers 410 and 420 are determined by server 440 to be in close proximity to the object 404, such as an entrance door with known approximate geographic coordinates. The server 440 sends the command 444 to the remote reader 410 to turn off its GPS function in order to conserve its battery, and to use the geographic coordinates of object 404 instead of the GPS coordinate of the reader 410, as long as it remains within the range of the signal from object 404 electronic tag.

Further on FIG. 4, the objects 401, 402 and 404 are determined to belong to a set, If the set remains complete with objects 401, 402 and 404 for a period of time greater than, for example, 5 minutes, server 440 sends the command 445 to the electronic tag attached to object 401 to increase its broadcast period, or to decrease its transmit power, or both, in order to reduce the tag power consumption and to conserve its battery.

What is claimed is:

1. In a system having a plurality of Bluetooth low energy (BLE) beacons transmitting their ID and wherein tagged objects have a tag descriptor and a descriptive identity unrelated to location thereof, a method of providing the relative location of an electronically tagged target object comprising:
   using a plurality of suitably programmed mobile devices to read IDs of at least some of the BLE beacons transmitting their IDs, wherein at least some mobile devices read the ID of a same electronically tagged object;
   transmitting the read IDs and relative location information from the mobile devices to a server;
   storing the read IDs and relative location information on the server, wherein the server after collecting data from plural mobile devices determines a spatial relationship between different received IDs;
   upon receiving a query for the location of the tagged target object or the identity of an electronic tagged object in proximity to the tagged target object, the sever determining from the database of a plurality of tagged objects one or more tagged objects that is in proximity to the target tagged object and returning the descriptive identity of the one or more tagged objects in proximity to the target tagged object.

2. A method as defined in claim 1 wherein the proximity is at 20 feet or less, and where the descriptive identity is the common name for that object.

3. A method as defined in claim 2 comprising using a database and a suitably programmed processor for grouping electronically tagged objects into sets of objects that are within 20 feet or less from each other.

4. A method as defined in claim 3 transmitting an alert when an electronically tagged object is determined to be no longer in proximity to other tagged objects in a set.

5. A method as defined in claim 1 wherein tagged objects are each tagged with a BLE beacon having a unique identity, and wherein the mobile device is a suitably programmed mobile phone, programmed to read IDs from BLE beacons.

6. A method as defined in claim 5, further comprising:
   utilizing received signal strength indication (RSSI) to measure distances between the mobile device and at least some of the plurality of BLI beacons including the target object's beacon.

7. A method as defined in claim 6 comprising:
   on a server receiving the measurements from the remote reader and calculating distances between the at least some of plurality of RF beacons including the target RF beacon from the measured distances.

8. A method as defined in claim 7 wherein providing the position of the object or its target RF beacon includes returning the common names associated with one or more objects.

9. A method as defined in claim 7, wherein the target RF beacon and at least a plurality of other RF beacons form a set of objects that are within at least 20 feet of each other and are moving.

10. A method as defined in claim 6, including monitoring the set to determine if an item previously in the set is absent from the set.

11. In a system having a plurality of Bluetooth low energy (BLE) beacons transmitting their ID and wherein tagged objects have a tag descriptor and a descriptive identity unrelated to location thereof,
   a method of providing the relative location of an electronically tagged target object comprising:
   using a plurality of suitably programmed mobile devices to read IDs of at least some of the BLE beacons transmitting their IDs, wherein at least some mobile devices read the ID of a same electronically tagged object;
   transmitting the read IDs and relative location information from the mobile devices to a server;
   storing the read IDs and relative location information on the server, wherein the server after collecting data from plural mobile devices determines a spatial relationship between different received IDs;
   upon receiving a query for the location of the tagged target object or the identity of an electronic tagged object in proximity to the tagged target object, the sever determining from the database of a plurality of tagged objects one or more tagged objects that is in proximity to the target tagged object and returning the descriptive identity of the one or more tagged objects in proximity to the target tagged object
   wherein tagged objects are each tagged with a BLE beacon having a unique identity;
   measuring a first distance between the remote reader mobile device and the target BLE beacon
   measuring a second distance between a second mobile device and the target BLE beacon;
   if both distances are less than 10 ft, concluding that distance between the mobile device and the second mobile device is less than 20 ft, reducing the first reader rate of scanning for signals from the BLE beacons used to electronically tag the said objects in order to reduce the first reader power consumption.

12. A method as defined in claim 6 further comprising:
   turning off a GPS receiver within a mobile device to reduce power consumption by the mobile device when it is determined that the distance between the mobile device and a BLE beacon is determined to be less than 20 feet and the geographic coordinates of the BLE beacon are known, and can be used in place of the GPS coordinates.

13. A method as defined in claim 2, wherein the received query is received from a query system accepting verbal input from a user making the request and the descriptive identity of the one or more tagged objects in proximity to the target tagged object is provided to a user from said query system in the form of a verbal response.

* * * * *